Feb. 24, 1925.  
A. H. WOODWARD  
ADVERTISING APPARATUS  
Filed March 6, 1922  
1,527,289  
3 Sheets-Sheet 1
Fig. 1
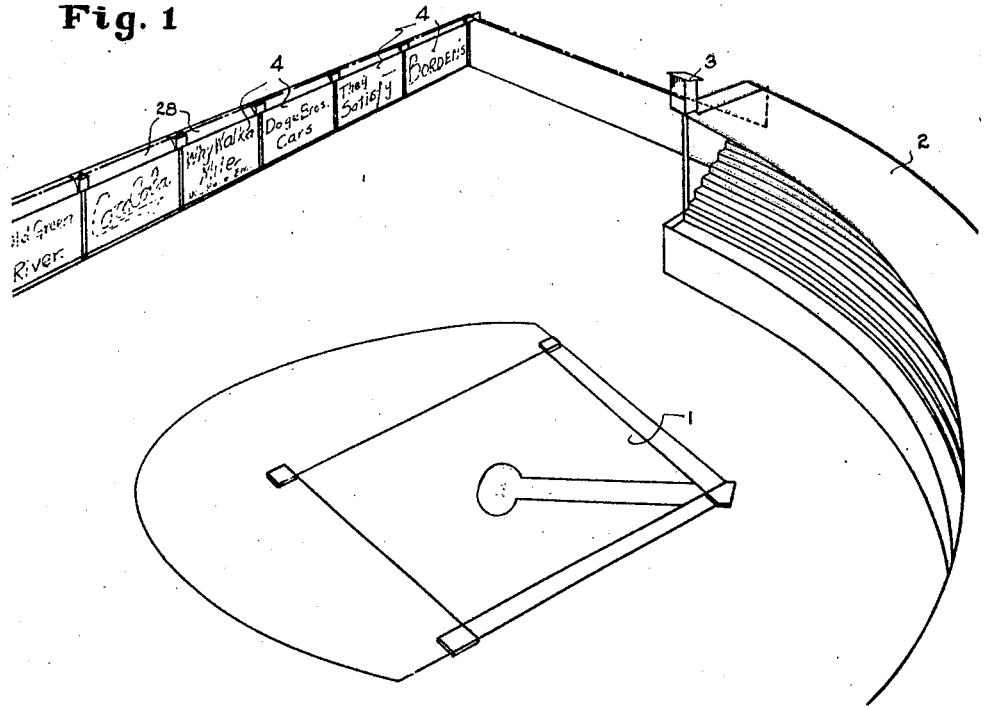
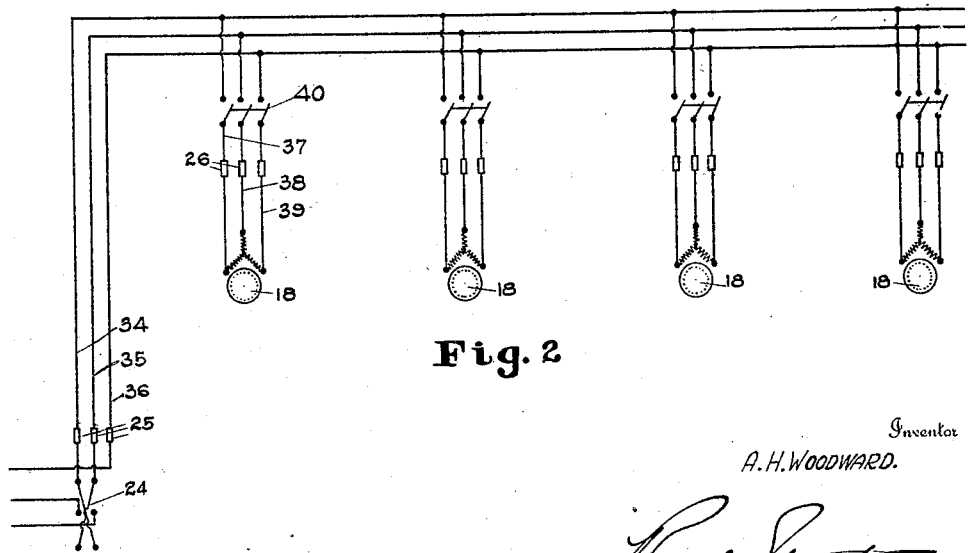
Fig. 2
Inventor  
A. H. WOODWARD.
By  
Attorney Feb. 24, 1925. 1,527,289
A. H. WOODWARD
ADVERTISING APPARATUS
Filed March 6, 1922 3 Sheets-Sheet 2
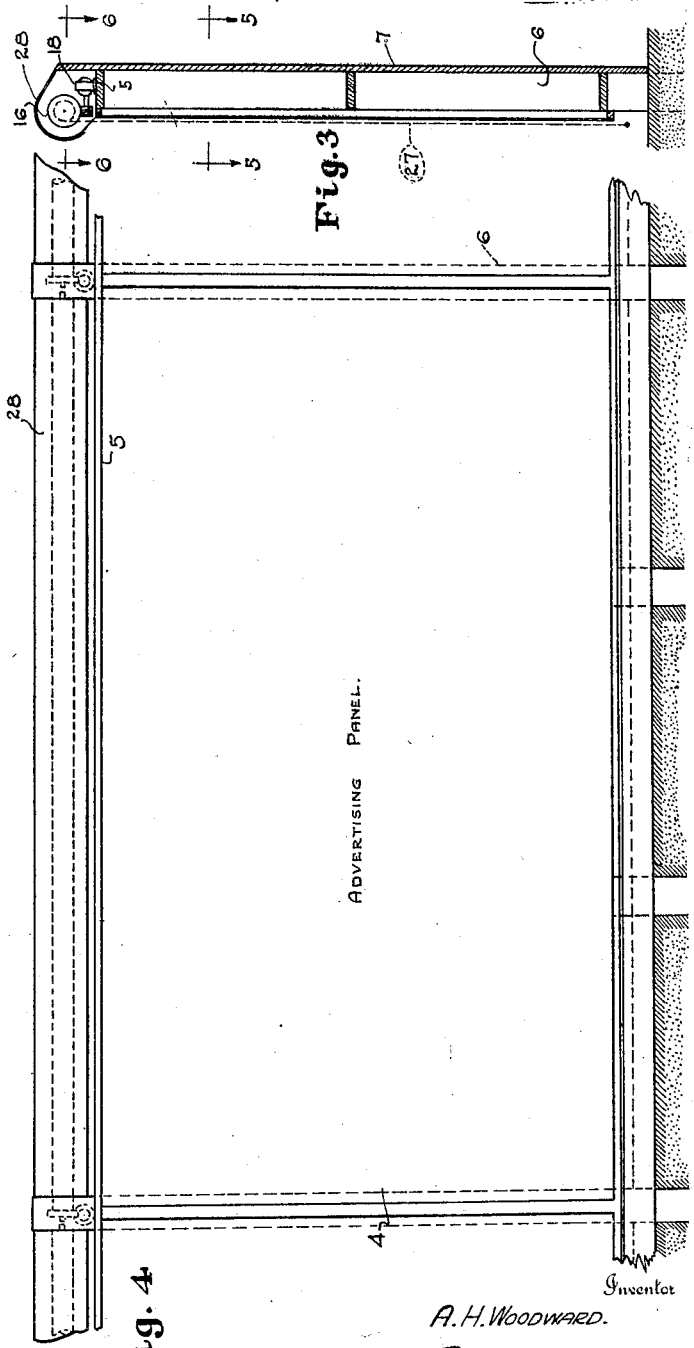
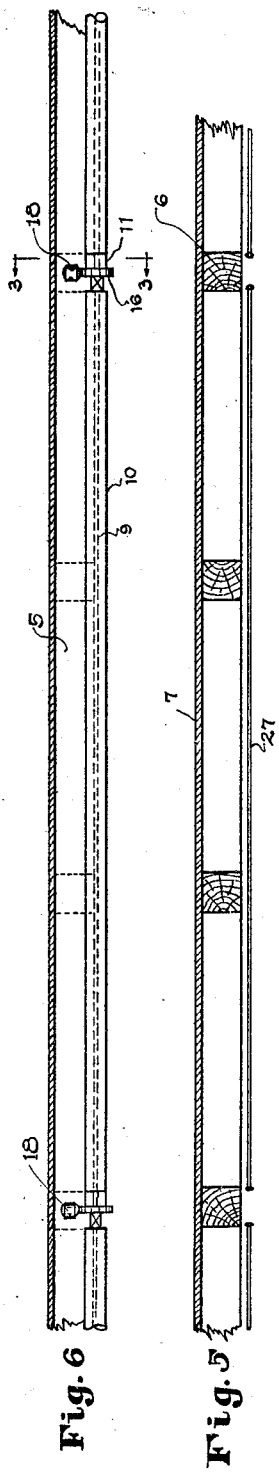
A. H. WOODWARD.

Feb. 24, 1925.
A. H. WOODWARD
1,527,289
ADVERTISING APPARATUS
Filed March 6, 1922   3 Sheets-Sheet 3
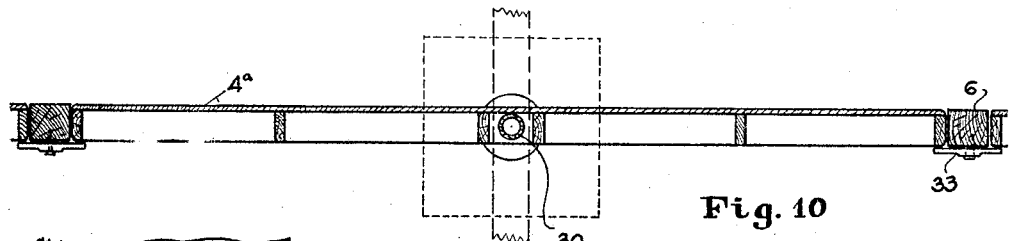
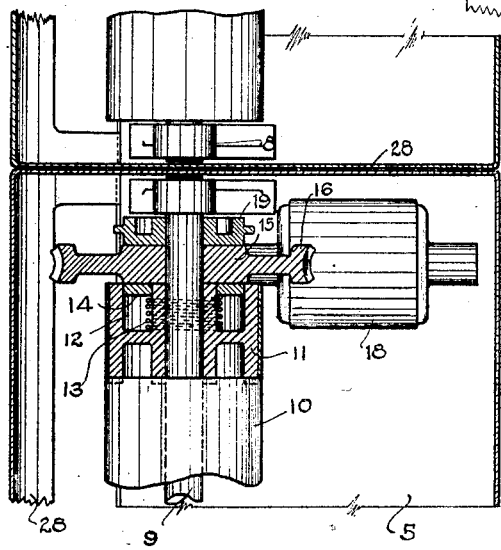
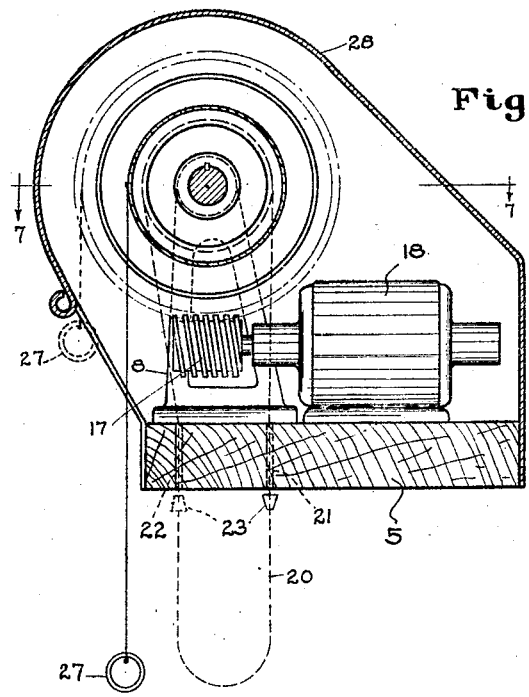
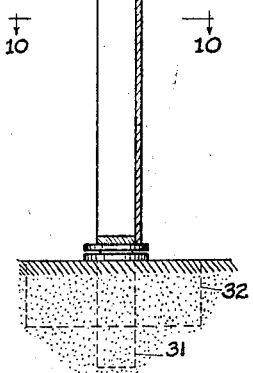
Inventor
A.H. WOODWARD.
By
Attorney Patented Feb. 24, 1925.

1,527,289

UNITED STATES PATENT OFFICE.

ALLEN H. WOODWARD, OF BIRMINGHAM, ALABAMA.

ADVERTISING APPARATUS.

Application filed March 6, 1922. Serial No. 541,615.

*To all whom it may concern:*

Be it known that I, ALLEN H. WOODWARD, a citizen of the United States of America, residing at Birmingham, in the county of Jefferson and State of Alabama, have invented certain new and useful Improvements in Advertising Apparatus, of which the following is a specification.

My invention relates to an advertising apparatus which is more particularly adapted for use in ball parks and the like where it is of advantage to be able to interpose neutral colored curtains or the like to cover the variegated colors, utilized in the advertising displays, so as to present a suitable background to the players which will not interfere with their vision of the ball.

Considering my invention in its adaptation to ball parks it is well known that the players at present have very great objection to the use of advertising displays on the ball park fence or any where that the same will come in line with the player's vision of the ball as the ball is often lost against such a background, whereas it would be clearly visible against a background of neutral tint. The chief purpose of this invention, therefore, is to devise a means whereby valuable advertising space about ball parks can be profitably utilized without subjecting the players to the disadvantages above pointed out and to this end my invention contemplates the provision of a series of neutral colored curtains adapted to be raised and lowered by remote control so as to conceal the advertising when it would interfere with the players and to expose it when it would not so interfere.

My invention further contemplates the provision of simple and effective operating mechanisms especially adapted for remote control which will quickly raise and lower the curtains either simultaneously as a whole, or in groups, or independently if desired.

My invention also contemplates the adaptation of each curtain operating means under remote control to release its curtain at the desired points for its raised and lowered positions and to do this automatically.

My invention will be better understood by reference to the accompanying drawings, in which I illustrate only what I regard as the preferred embodiment of the same.

In the drawings:—

Fig. 1 is a perspective view of a portion of a ball park showing the advertising panels with curtain mechanism for covering and exposing the same under remote control.

Fig. 2 is a diagrammatic view of the electric circuits controlling the curtain motors.

Fig. 3 is a vertical sectional elevation taken on the line 3—3 of Fig. 6 through a fence showing the curtain lowered in dotted lines.

Fig. 4 is a front elevation of a panel of the fence with the advertising display omitted and the curtain raised.

Figs. 5 and 6 are cross-sectional views taken on the lines 5—5 and 6—6, respectively, of Fig. 3.

Fig. 7 is a detail view of the motor drive for the curtain rods, the view being taken on the section line 7—7 of Fig. 8.

Fig. 8 is an end elevation of the motor drive for the curtain.

Fig. 9 is a vertical sectional view of a reversible fence panel which is capable of being rotated about a vertical axis to bring its display face towards the inside or towards the outside of the ball park or other enclosure as may be desired.

Fig. 10 is a cross-sectional view on the line 10—10 of Fig. 9.

Similar reference numerals refer to similar parts throughout the drawings.

In Fig. 1 I have illustrated in part a ball park having a diamond 1, a grand stand 2 and a control box 3 which may be located at any convenient place and in which I place the electrical switch mechanism for controlling the operation of the curtains which are utilized to conceal the advertising fence panels 4 which extend along the out field and in the line of vision of the players. It is to be understood, however, that these panels may be part of the fence, grand stand or other structure, wherever they would interfere with the vision of the players.

I have illustrated the panels as portions of a fence which has a top rail 5 on posts 6. The back boards 7 of the fence preferably rise above the top rail 5 and I mount above each panel, in suitable bearings 8, a shaft 9 having approximately the same length as the panel and having mounted fast thereon a curtain roll 10. The roll has at one end a metallic extension 11 also fast on the shaft 9 and provided in its outer end with a recess 12 in which is housed a coiled compression spring 13. This spring engages and presses outwardly a friction ring 14, causing it to engage a smooth side face of the hub 15 of a worm wheel 16, which wheel is loose on the shaft 9 and is adapted to mesh a worm gear 17 driven by a small electric motor 18 also mounted on the top rail 5 in position to bring the worm gear beneath the worm wheel. Between the worm wheel and the adjacent bearing 8 I mount fast, on shaft 9, a sprocket wheel 19 which receives a sprocket chain 20. This is an endless chain, the flights of which pass through slots 21 and 22 in the top rail 5. The loop of the chain hanging below the top rail has fast thereon a stop 23 which is larger than either opening 21 or 22 and which thus serve to arrest the rotation of the shaft 9 after a predetermined rotation in either direction.

The motors 18 are preferably of the three phase A. C. squirrel cage, induction, low-voltage, reversible type, and as shown in Fig. 2, are operated from the main distribution leads 34, 35, 36 by branch circuits 37, 38 and 39.

For each motor I would provide a 3-pole fused cut-out switch 40. This switch will enable any motor to be rendered inoperative, if so desired, without affecting the operation of the other motors in the group. The reversing of all motors will be accomplished by a 2-pole double-throw reversing switch 24 in the main distribution leads located in the operator's box 3 at some convenient point where the play can be readily observed. The fuses for the switches 24 and 40, respectively, are designated 25 and 26 and may be of any suitable type.

Upon each curtain roll 10 I mount a curtain 27 which is co-extensive in width with its respective advertising panel 4 and in length is sufficient to cover the panel when the curtain is lowered. Over each curtain roller I mount a metallic shield or housing 28 having a suitable opening for the curtain to drop therethrough.

The operation of my invention, as thus far described, is as follows. Assuming that the master switch 24 is last thrown so as to cause the motor to move in a direction to roll the curtains up, when the curtains were completely raised the stop 23 would engage the top rail and stop the further rotation of the shaft 9, notwithstanding that the motors 18 may continue to drive the worm wheels 16 which, since they have only frictional engagement with the curtain rolls, are free to continue to turn after the rolls are stopped. When the motor is stopped, the curtain will be held so that it will not tend to unroll itself, as the worm gearing will prevent the reverse rotation of the roll and there is not sufficient overhang of the curtain to overcome the frictional resistance of the friction ring 14 against the locked worm wheel. The curtains will thus stand in raised position after the master switch is open. When the play is ready to commence the operator throws the master switch to reverse position and all of the motors respond instantly, rotating the worm wheels in a reverse direction and unrolling the curtains until the stops 23 again come into engagement with the top rail and lock the shaft 9. The motors may be left running or the master switch may be opened and as soon as the play is interrupted, or the display of the panels will not interfere with it, the master switch is again reversed and the curtains are quickly rolled up to display the panels.

Any desired panel may be cut out of group control by its individual switch 40 and, if desired, the individual circuits 37, 38 and 39 may be all carried to the control box and there controlled individually or in groups as desired.

In Figs. 9 and 10 I illustrate a modification of my invention in which it is desired to mount the advertising panels 4ª, corresponding to 4, on a pivotal fence section which can be swung to face either the playing field or the street. This panel has a top center journal pin 29 and at its bottom it has a center shaft 30 which turns in a sleeve 31 set in a suitable concrete foundation 32. The panels are adapted to be engaged and located in either operating position by the pivoted latches 33 on the fence posts 6, which support the top rail 5 on which the upper journal bearings are mounted. This top rail also carries the curtain rolls, their operating mechanism and housings as already described. The operation of this phase of my invention is the same as that already described, and when the ball park is not in use the panels are latched in their outer or street display position.

It is to be understood that the length of the curtains and the manner of mounting and operating the same may be modified without departure from my invention to meet different and varied conditions.

Though I have described with great particularity the details of the embodiment of the invention herein shown, it is not to be construed that I am limited thereto as changes in arrangement and substitution of equivalents may be made by those skilled in the art without departing from the invention as defined in the appended claims.

Therefore without limiting myself to the detailed construction shown, what I claim as new and desire to secure by Letters Patent, is:—

1. In a play ground having partially enclosing walls covered with bright colored surfaces which are disposed in the line of vision of the players, a plurality of neutral tone curtains mounted in front of said colored surfaces and adapted when moved to operating position to intercept glare of light being reflected from said surfaces to the players, and electrically operated remotely controlled means for raising and lowering the several curtains in unison.

2. The combination with a walled enclosure, of a plurality of advertising panels carried by one or more of the interior walls of said enclosure, a curtain for each of said panels, and means operable from a distance for raising and lowering said curtains to alternately expose and render obscure the advertising matter of said panels.

3. The combination with an open air walled enclosure, of a plurality of advertising panels carried by one or more of the interior walls of said enclosure, means normally positioned to expose the advertising surfaces of said panels to view, and means operable from a distance to actuate said first mentioned means to and from normally disposed position at will, said first mentioned means acting to render the advertising matter of said panels obscure when actuated from normally disposed position.

In testimony whereof I affix my signature.

ALLEN H. WOODWARD.

Witness:
 NOMIE WELSH.